(12) United States Patent
Sun et al.

(10) Patent No.: US 12,554,709 B2
(45) Date of Patent: Feb. 17, 2026

(54) IN-CONTEXT TEXT-TO-SQL WITH REDUCED LABELED DATA

(71) Applicant: Google LLC, Mountain View, CA (US)

(72) Inventors: Ruoxi Sun, Santa Clara, CA (US); Sercan Omer Arik, San Francisco, CA (US); Rajarishi Sinha, Pittsburgh, PA (US); Hootan Nakhost, Waterloo (CA); Hanjun Dai, San Jose, CA (US); Pengcheng Yin, Cupertino, CA (US)

(73) Assignee: Google LLC, Mountain View, CA (US)

( * ) Notice: Subject to any disclaimer, the term of this patent is extended or adjusted under 35 U.S.C. 154(b) by 231 days.

(21) Appl. No.: 18/225,277

(22) Filed: Jul. 24, 2023

(65) Prior Publication Data

US 2024/0362212 A1 Oct. 31, 2024

Related U.S. Application Data

(60) Provisional application No. 63/462,701, filed on Apr. 28, 2023.

(51) Int. Cl.
*G06F 16/2452* (2019.01)
*G06F 16/242* (2019.01)

(52) U.S. Cl.
CPC .... *G06F 16/24522* (2019.01); *G06F 16/2433* (2019.01)

(58) Field of Classification Search
CPC ...... G06F 40/20; G06F 40/205; G06F 40/253; G06F 16/24522
See application file for complete search history.

(56) References Cited

U.S. PATENT DOCUMENTS

| | | | |
|---|---|---|---|
| 2018/0095962 A1* | 4/2018 | Anderson | G06F 16/2365 |
| 2024/0248896 A1* | 7/2024 | Boskovic | G06F 16/24522 |
| 2024/0303235 A1* | 9/2024 | Kulkarni | G06F 16/24522 |
| 2024/0330279 A1* | 10/2024 | Truong | G06F 16/2428 |
| 2024/0330421 A1* | 10/2024 | Ailawadi | G06F 21/31 |
| 2024/0362214 A1* | 10/2024 | Lyon | G06F 16/243 |

FOREIGN PATENT DOCUMENTS

WO    WO-2024207854 A1 * 10/2024

OTHER PUBLICATIONS

Yin, Pengcheng, et al. "Natural language to code generation in interactive data science notebooks." arXiv preprint arXiv:2212.09248 (2022). (Year: 2022).*

International Search Report and Written Opinion for PCT Application No. PCT/US2023/036091, dated Feb. 15, 2024. 14 pages.

(Continued)

*Primary Examiner* — Paras D Shah
(74) *Attorney, Agent, or Firm* — Lerner David LLP

(57) ABSTRACT

Aspects of the disclosure are directed to methods, systems, and non-transitory computer readable media for automatically generating queries on a database from natural language text using in-context learning to leverage zero-shot and few-shot adaptation capabilities of large language models (LLMs). The methods, systems, and non-transitory computer readable media can consider database information, employ execution based consistency decoding, and employ a mixture of prompts and/or LLMs.

17 Claims, 8 Drawing Sheets

(56) References Cited

OTHER PUBLICATIONS

Brown et al. 2020. Language models are few-shot learners. Advances in neural information processing systems, 33:1877-1901.

Chen et al. 2021. Evaluating large language models trained on code. arXiv preprint arXiv:2107.03374. 35 pages.

Chowdhery et al. 2022. Palm: Scaling language modeling with pathways. arXiv preprint arXiv:2204.02311. 87 pages.

Chung et al. 2022. Scaling instruction-finetuned language models. arXiv preprint arXiv:2210.11416. 54 pages.

Hoffmann et al. 2022. Training compute-optimal large language models. arXiv preprint arXiv:2203.15556. 23 pages.

Li et al. 2023. RESDSQL: Decoupling Schema Linking and Skeleton Parsing for Text-to-SQL. arXiv preprint arXiv:2302.05965. 9 pages.

Lin et al. 2020. Bridging textual and tabular data for cross-domain text-to-SQL semantic parsing. In Findings of the Association for Computational Linguistics: EMNLP 2020, pp. 4870-4888, Online. Association for Computational Linguistics.

Liu et al. 2023. A comprehensive evaluation of chat gpt's zero-shot text-to-sql capability. arXiv preprint arXiv:2303.13547. 7 pages.

Qi et al. 2022. Rasat: Integrating relational structures into pretrained seq2seq model for text-to-sql. arXiv preprint arXiv:2205.06983. 15 pages.

Rajkumar et al. 2022. Evaluating the text-to-sql capabilities of large language models. arXiv preprint arXiv:2204.00498. 13 pages.

Scholak et al. 2021. Picard: Parsing incrementally for constrained auto-regressive decoding from language models. arXiv preprint arXiv:2109.05093. 7 pages.

Stiennon et al. 2020. Learning to summarize with human feedback. Advances in Neural Information Processing Systems, 33:3008-3021.

Wang et al. 2020. RAT-SQL: Relation-aware schema encoding and linking for text-to-SQL parsers. In Proceedings of the 58th Annual Meeting of the Association for Computational Linguistics, pp. 7567-7578, Online. Association for Computational Linguistics.

Wang et al. 2022. Self-consistency improves chain of thought reasoning in language models. arXiv preprint arXiv:2203.11171. 24 pages.

Wei et al. 2022. Emergent abilities of large language models. arXiv preprint arXiv:2206.07682. 30 pages.

Xie et al. 2022. UnifiedSKG: Unifying and multi-tasking structured knowledge grounding with text-to-text language models. arXiv preprint arXiv:2201.05966. 30 pages.

Yu et al. 2018. Spider: A large-scale human-labeled dataset for complex and cross-domain semantic parsing and text-to-sql task. arXiv preprint arXiv:1809.08887. 11 pages.

Zhong et al. 2020. Semantic evaluation for text-to-sql with distilled test suites. arXiv preprint arXiv:2010.02840. 16 pages.

Zhou et al. 2022. Prompt consistency for zero-shot task generalization. In Findings of the Association for Computational Linguistics: EMNLP 2022, pp. 2613-2626, Abu Dhabi, United Arab Emirates. Association for Computational Linguistics.

* cited by examiner

Concise Prompt 202

Convert text to SQL.
[Schema] Manager: Manager_ID, Singer: Singer_ID, Name, Country (France), Age
[Type] Manager: Manager_ID, Singer: Singer_ID, (Number), Name (String), Country (String), Age (Number)
[Primary Keys] Singer: Singer_ID
[Foreign Keys] Manager_ID
[Q] How many French singers?
[SQL] ...

Verbose Prompt 204

Convert text to SQL.
There is one table. Table name is Singer. Table Singer has four columns, and their Column names and data types are Singer_ID (Number), Name (String), Country (String), Age (Number). Primary Keys are Singer_ID. Foreign Keys are Singer_ID from Table Singer_in_concert is equivalent with Singer_ID from Table Singer. Question is how many French singers? The Column Country of Table Singer contain relevant information: "France". The corresponding SQL is: ...

FIG. 2

IN-CONTEXT TEXT-TO-SQL WITH REDUCED LABELED DATA

CROSS-REFERENCE TO RELATED APPLICATIONS

The present application claims the benefit of the filing date of U.S. Provisional Patent Application No. 63/462,701, filed Apr. 28, 2023, the disclosure of which is hereby incorporated herein by reference.

BACKGROUND

Text-to-standard query language (SQL) aims to automate the process of generating SQL queries on a database from natural language text. Text-to-SQL can enable natural language interfaces for SQL query generation in order to enhance database accessibility without requiring expertise in SQL as well as enable development of conversational agents with advanced data analytics. However, text-to-SQL is typically trained on large amounts of data, e.g., thousands of samples, requiring significant processing power and consumption of memory.

BRIEF SUMMARY

Aspects of the disclosure are directed to automatically generating SQL queries or other database language queries from natural language text using in-context learning to leverage zero-shot and few-shot adaptation capabilities of large language models (LLMs). The queries can be automatically generated by considering database information, employing execution based consistency decoding, and employing a mixture of prompts and/or LLMs. Aspects of the disclosure can outperform in-context learning without labeled data by a large margin and can close the gap with fine tuning learning with thousands of labeled data. Aspects of the disclosure allow for automatically generating queries with significantly less processing power and memory consumption.

An aspect of the disclosure provides for a method for processing queries, the method including: receiving, by one or more processors, a natural language query; converting, by the one or more processors, the natural language query into a database language query using database information; and executing, by the one or more processors, the database language query to generate a result for the natural language query.

In an example, the database information includes database schema, database content, primary keys that uniquely identify rows of each table of the database schema, and foreign keys that join one or more tables of the data schema.

In another example, converting the natural language query into a database language query includes: generating various database description prompts; sampling one or more large language models (LLMs) multiple times with the various database description prompts to generate a plurality of potential database language queries; executing the plurality of potential database language queries to generate a plurality of potential results; and selecting the database language query that provides a result consistent with a threshold amount of the plurality of potential results.

In yet another example, the various database description prompts include a concise prompt and a verbose prompt. In yet another example, converting the natural language query into a database language query includes removing errors from the plurality of potential results. In yet another example, converting the natural language query into a database language query includes concatenating the plurality of potential results. In yet another example, the threshold amount includes a majority of the plurality of potential results.

In yet another example, the database language query includes at least one of standard query language (SQL) or graph query language (GraphQL).

Another aspect of the disclosure provides for a system including: one or more processors; and one or more storage devices coupled to the one or more processors and storing instructions that, when executed by the one or more processors, cause the one or more processors to perform operations for processing queries, the operations including: receiving a natural language query; converting the natural language query into a database language query using database information; and executing the database language query to generate a result for the natural language query.

In an example, the database information includes database schema, database content, primary keys that uniquely identify rows of each table of the database schema, and foreign keys that join one or more tables of the data schema.

In another example, converting the natural language query into a database language query includes: generating various database description prompts; sampling one or more large language models (LLMs) multiple times with the various database description prompts to generate a plurality of potential database language queries; executing the plurality of potential database language queries to generate a plurality of potential results; and selecting the database language query that provides a result consistent with a threshold amount of the plurality of potential results.

In yet another example, the various database description prompts include a concise prompt and a verbose prompt. In yet another example, converting the natural language query into a database language query includes removing errors from the plurality of potential results. In yet another example, converting the natural language query into a database language query includes concatenating the plurality of potential results. In yet another example, the threshold amount includes a majority of the plurality of potential results.

In yet another example, the database language query includes at least one of standard query language (SQL) or graph query language (GraphQL).

Yet another aspect of the disclosure provides for a non-transitory computer readable medium for storing instructions that, when executed by one or more processors, cause the one or more processors to perform operations for processing queries, the operations including: receiving a natural language query; converting the natural language query into a database language query using database information; and executing the database language query to generate a result for the natural language query.

In an example, converting the natural language query into a database language query includes: generating various database description prompts; sampling one or more large language models (LLMs) multiple times with the various database description prompts to generate a plurality of potential database language queries; executing the plurality of potential database language queries to generate a plurality of potential results; and selecting the database language query that provides a result consistent with a threshold amount of the plurality of potential results.

In another example, converting the natural language query into a database language query includes removing errors from the plurality of potential results. In yet another example, converting the natural language query into a database language query includes concatenating the plurality of potential results.

BRIEF DESCRIPTION OF THE DRAWINGS

FIG. 2 depicts a block diagram of example database description prompts according to aspects of the disclosure.

DETAILED DESCRIPTION

The technology generally relates to systems, methods, and non-transitory computer readable media for processing natural language queries, which can include prompt design with database content, execution-based consistency decoding, and a mixture of prompts and LLMs.

The systems, methods, and non-transitory computer readable media can process queries by receiving a natural language query, converting the natural language query into SQL or other database language query using database information, and executing the SQL to generate a result for the natural language query. The database information can include database schema, database content, primary keys, and foreign keys. The database schema can include multiple tables, where each table contain a table name, column name, and column data type. The primary keys can uniquely identify rows of each table of the database schema and the foreign keys can join one or more tables of the multiple tables.

The systems, method, and non-transitory computer readable media can convert the natural language query into SQL by generating various database description prompts. The various database description prompts can include concise prompts that linearizes information to describe table structure and verbose prompts that describe the database information with natural language, emphasizing need to know information for the LLMs.

The systems, methods, and non-transitory computer readable media can sample one or more LLMs multiple times with the various database description prompts to generate a plurality of potential SQLs. The systems, methods, and non-transitory computer readable media can execute the plurality of potential SQLs using an execution engine to generate a plurality of potential results. After removing errors from the plurality of potential results, the systems, methods, and non-transitory computer readable media can concatenate the plurality of potential results and select the SQL that provides a result consistent with a threshold amount of the plurality of potential results. The threshold amount can be a majority of the plurality of potential results. In addition to or alternative to the threshold amount, a model, such as an LLM, can select the SQL. For example, the systems, methods, and non-transitory computer readable media can input the plurality of potential SQLs and plurality of potential results into a prompt for an LLM, where the LLM can select the SQL.

Figure 1:
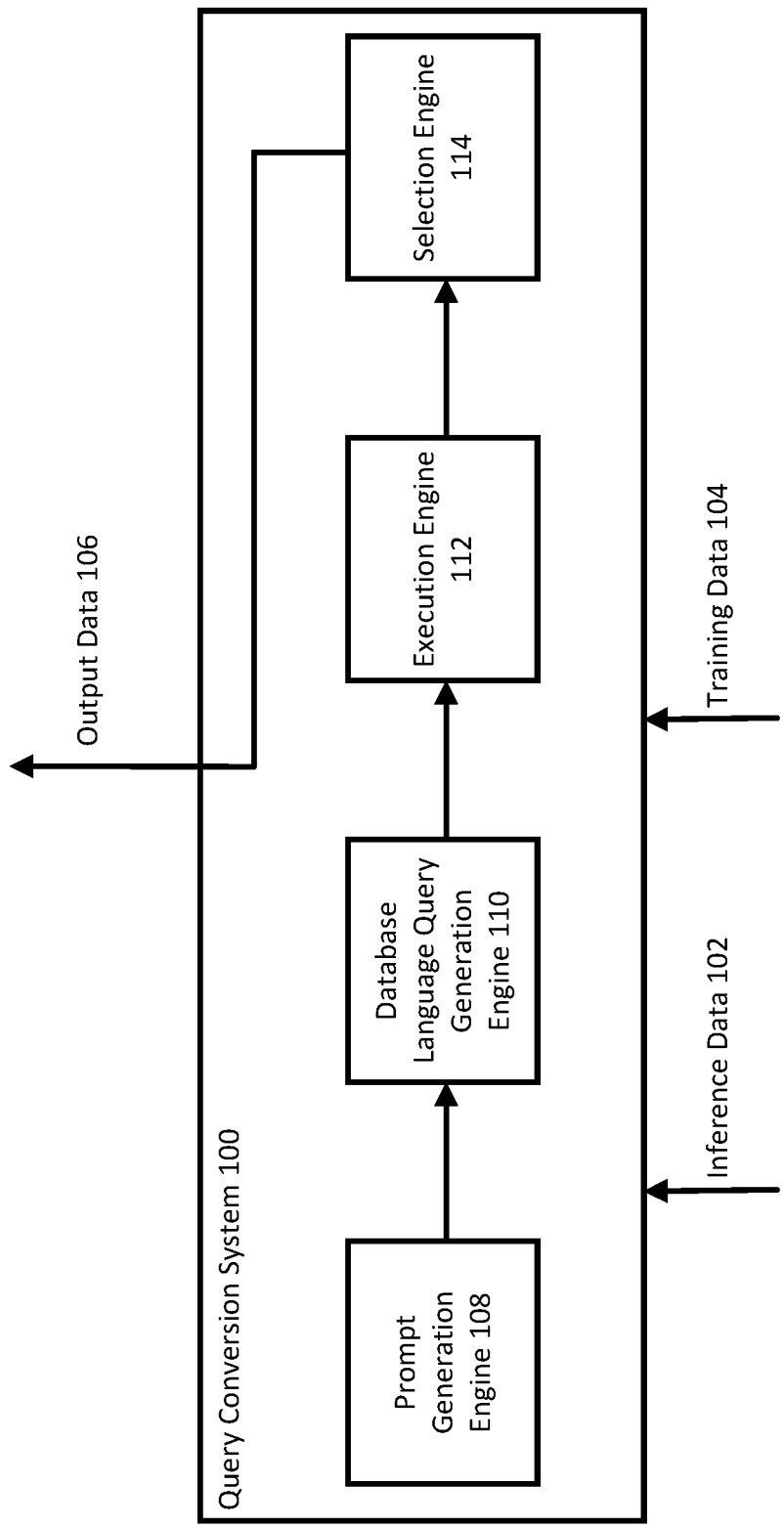
FIG. 1 depicts a block diagram of an example query conversion system for converting natural language queries into database language queries according to aspects of the disclosure.

FIG. 1 depicts a block diagram of an example query conversion system 100 for converting natural language queries into database language queries. Database language queries can include standard query language (SQL) or graphical query language (GraphQL), as examples. The query conversion system 100 can be implemented on one or more computing devices in one or more locations.

The query conversion system 100 can be configured to receive inference data 102 and/or training data 104 for use in converting natural language queries into database language queries. For example, the query conversion system 100 can receive the inference data 102 and/or training data 104 as part of a call to an application programming interface (API) exposing the query conversion system 100 to one or more computing devices. The inference data 102 and/or training data 104 can also be provided to the query conversion system 100 through a storage medium, such as remote storage connected to the one or more computing devices over a network. The inference data 102 and/or training data 104 can further be provided as input through a user interface on a client computing device coupled to the query conversion system 100.

The inference data 102 can include data associated with converting a natural language query into a database language query. The data associated with converting a natural language query into a database language query can include the natural language query and database information. Database information can include database schema, primary keys, and/or foreign keys. Database schema can include multiple tables, each with a table name, column name, and column data type. Primary keys can uniquely identify rows of each table and foreign keys can join multiple tables.

The training data 104 can correspond to a machine learning task for converting natural language queries to database language queries, such as a task performed by a large language model (LLM). The training data can be split into a training set, a validation set, and/or a testing set. An example training/validation/testing split can be an 80/10/10 split, although any other split may be possible. The training data 104 can include examples for converting natural language queries into database language queries.

The training data 104 can be in any form suitable for training a model, according to one of a variety of different learning techniques. Learning techniques for training a model can include supervised learning, unsupervised learning, semi-supervised learning techniques, parameter-efficient techniques and reinforcement learning techniques. Training the model can further include priming the model using zero- or few-shot prompting to output higher-quality responses. For example, the training data 104 can include multiple training examples that can be received as input by a model. The training examples can be labeled with a desired output for the model when processing the labeled training examples. The label and the model output can be evaluated through a loss function to determine an error, which can be back propagated through the model to update weights for the model. For example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

From the inference data 102 and/or training data 104, the query conversion system 100 can be configured to output one or more results related to converting natural language queries into database language queries, generated as output data 106. The output data 106 can include a database language query converted from a natural language query and/or instructions associated with the database language query. As an example, the query conversion system 100 can be configured to send the output data 106 for display on a client or user display. As another example, the query conversion system 100 can be configured to provide the output data 106 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The query conversion system 100 can further be configured to forward the output data 106 to one or more other devices configured for translating the output data into an executable program written in a computer programming language. The query conversion system 100 can also be configured to send the output data 106 to a storage device for storage and later retrieval.

The query conversion system 100 can include a prompt generation engine 108, a database language query generation engine 110, an execution engine 112, and a selection engine 114. The prompt generation engine 108, database language query generation engine 110, execution engine 112, and/or selection engine 114 can be implemented as one or more computer programs, specially configured electronic circuitry, or any combination thereof.

The prompt generation engine 108 can be configured to generate various database description prompts based on the database information. The database description prompts can include database schema as well as primary keys, foreign keys, and/or database content. The primary keys, foreign keys, and/or database content allow the prompt generation engine 108 to understand the database schema, such as by linking tables and selecting appropriate columns. The database description prompts can include one or more concise prompts and one or more verbose prompts. Concise database description prompts can linearize information in a table, such as "Table1 name: column name 1, column name 2 (relevant database content) Table2 name: column1 . . . ". FIG. 2 depicts a block diagram of example database description prompts 200, including a concise prompt 202 for the query "How many French singers?". Verbose database description prompts can describe the database information with natural language while emphasizing higher priority information, such as "Table CarNames contains three columns. The column names and their types are: MakeID (number), Model (string), . . . Foreign keys are . . . use foreign keys to join Tables". The example database description prompts 200 of FIG. 2 include a verbose prompt 204 for the query "How many French singers?".

The database language query generation engine 110 can be configured to sample one or more LLMs multiple times with the various database description prompts to generate corresponding potential database query languages. The database language query generation engine 110 can query the LLMs multiple times to generate the potential database query languages. The database language query generation engine 110 can query the LLMs multiple times with the same database description prompt and with differing database description prompts.

The execution engine 112 can be configured to execute the potential database query languages to generate corresponding potential results. The execution engine 112 can be further configured to remove errors from the corresponding results. The execution engine 112 can also be configured to concatenate the corresponding results.

The selection engine 114 can be configured to select a database query language of the potential database query languages that provides a corresponding result consistent with a threshold amount of the corresponding results. For example, the threshold amount can be a majority of the corresponding results. The selection engine 114 can further be configured to select a database query language using a machine learning model, such as an LLM. For example, the selection engine 114 can input the potential database query languages and corresponding results into a prompt for an LLM and the LLM can select the database query language.

Figure 3:
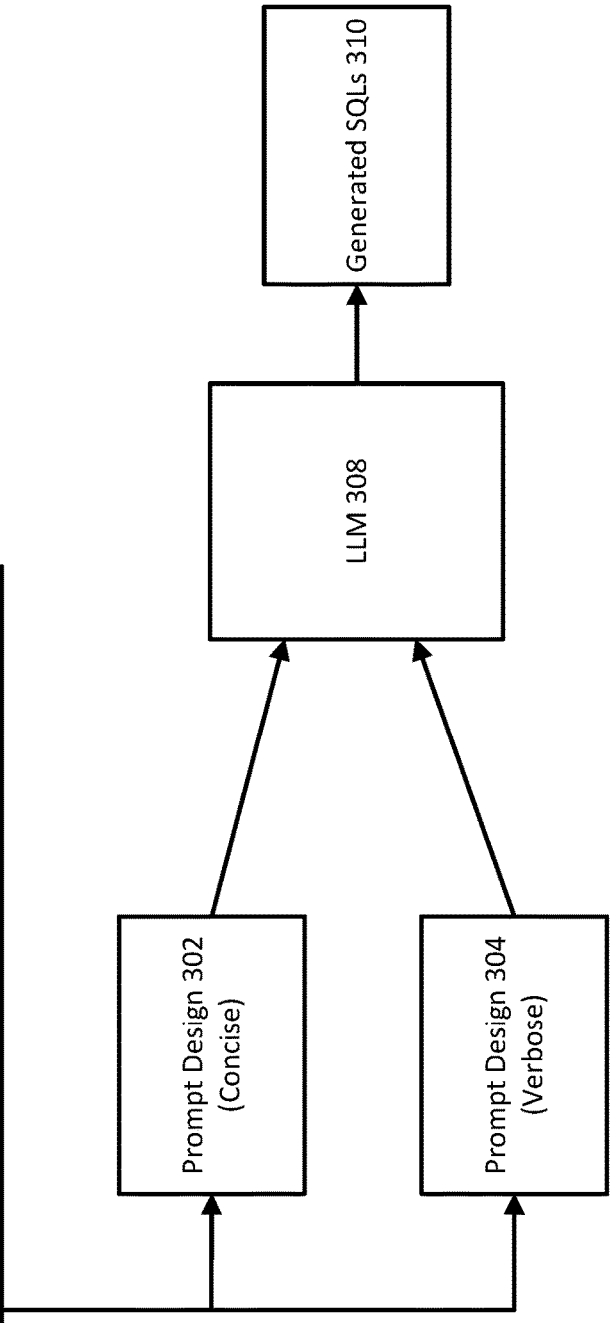
FIG. 3 depicts a block diagram of an example query conversion sub-system for generating potential SQLs according to aspects of the disclosure.

FIG. 3 depicts a block diagram of an example query conversion sub-system 300 for generating potential SQLs for the natural language query "How many French singers?". The example sub-system 300 can correspond to the prompt generation engine 108 and database language query generation engine 110 as depicted in FIG. 1. In this example sub-system 300, a concise prompt 302 and a verbose prompt 304 are generated from the natural language query and database information 306. The database information 306 includes a table of singers and information about the singers, including name, country, and age. The concise prompt 302 and the verbose prompt 304 can respectively correspond to the concise prompt 202 and verbose prompt 204 as depicted in FIG. 2. The concise prompt 302 and verbose prompt 304 are input to an LLM 308 multiple times, which generates a plurality of potential SQLs 310.

Figure 4:
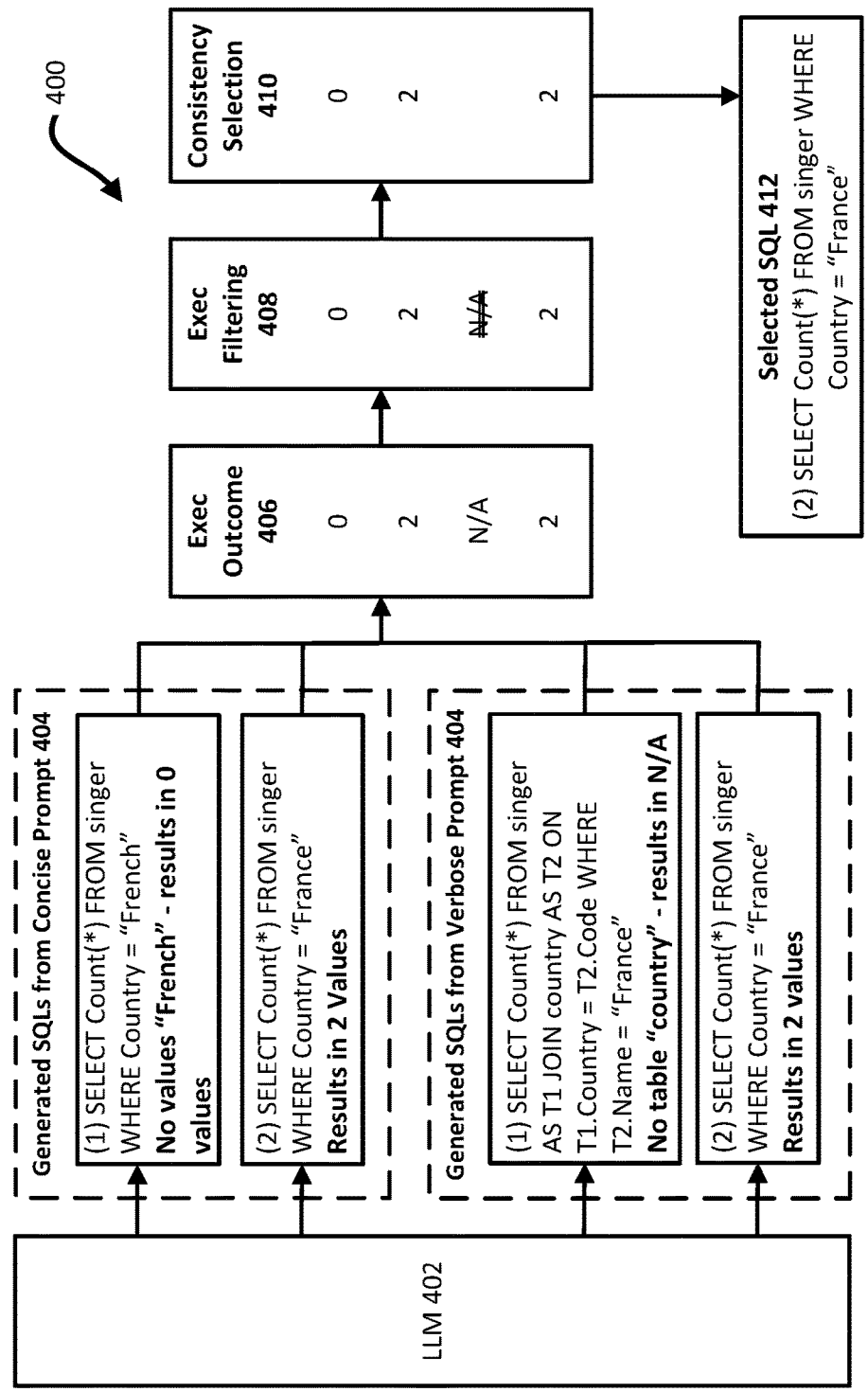
FIG. 4 depicts a block diagram of an example query conversion sub-system for selecting an SQL according to aspects of the disclosure.

FIG. 4 depicts a block diagram of an example query conversion sub-system 400 for selecting an SQL for converting the natural language query "How many French singers?". The example sub-system 400 can correspond to the execution engine 112 and selection engine 114 as depicted in FIG. 1. In this example sub-system 400, a LLM 402 can generate a plurality of potential SQLs 404. The LLM 402 and the plurality of potential SQLs 404 can respectively correspond to the LLM 308 and the plurality of potential SQLs 310 as depicted in FIG. 3.

The plurality of potential SQLs 404 can include generated SQLs from a concise prompt and generated SQLs from a verbose prompt. Here, each prompt generated two potential SQLs based on inputting each prompt into the LLM 402 twice, though any number of potential SQLs can be generated by inputting each prompt into the LLM 402 any number of times. The potential SQLs 404 can be executed to generate outcomes or results 406. Here, the first generated SQL from the concise prompt resulted in a value of 2, the second generated SQL from the concise prompt resulted in a value of 0, the first generated SQL from the verbose prompt resulted in a value of N/A, and the second generated SQL from the verbose prompt resulted in a value of 2.

The outcomes or results 406 can be filtered to remove errors to generate filtered outcomes or results 408. Here, the value of N/A and the corresponding generated SQL is removed as an invalid output. An SQL can be selected that provides consistency 410 based on the filtered outcomes or results 408. Here, since the second generated SQL from the concise prompt and the second generated SQL from the verbose prompt both resulted in a value of 2 while the first generated SQL from the concise prompt resulted in a value of 0. Since a majority of the outcomes is 2, that generated SQL can be selected. The selected SQL 412 can be the second generated SQL from the concise prompt or the second generated SQL from the verbose prompt. Here, the generated SQL is the same, though in other examples, the generated SQL may differ but result in the same outcome.

Figure 5:
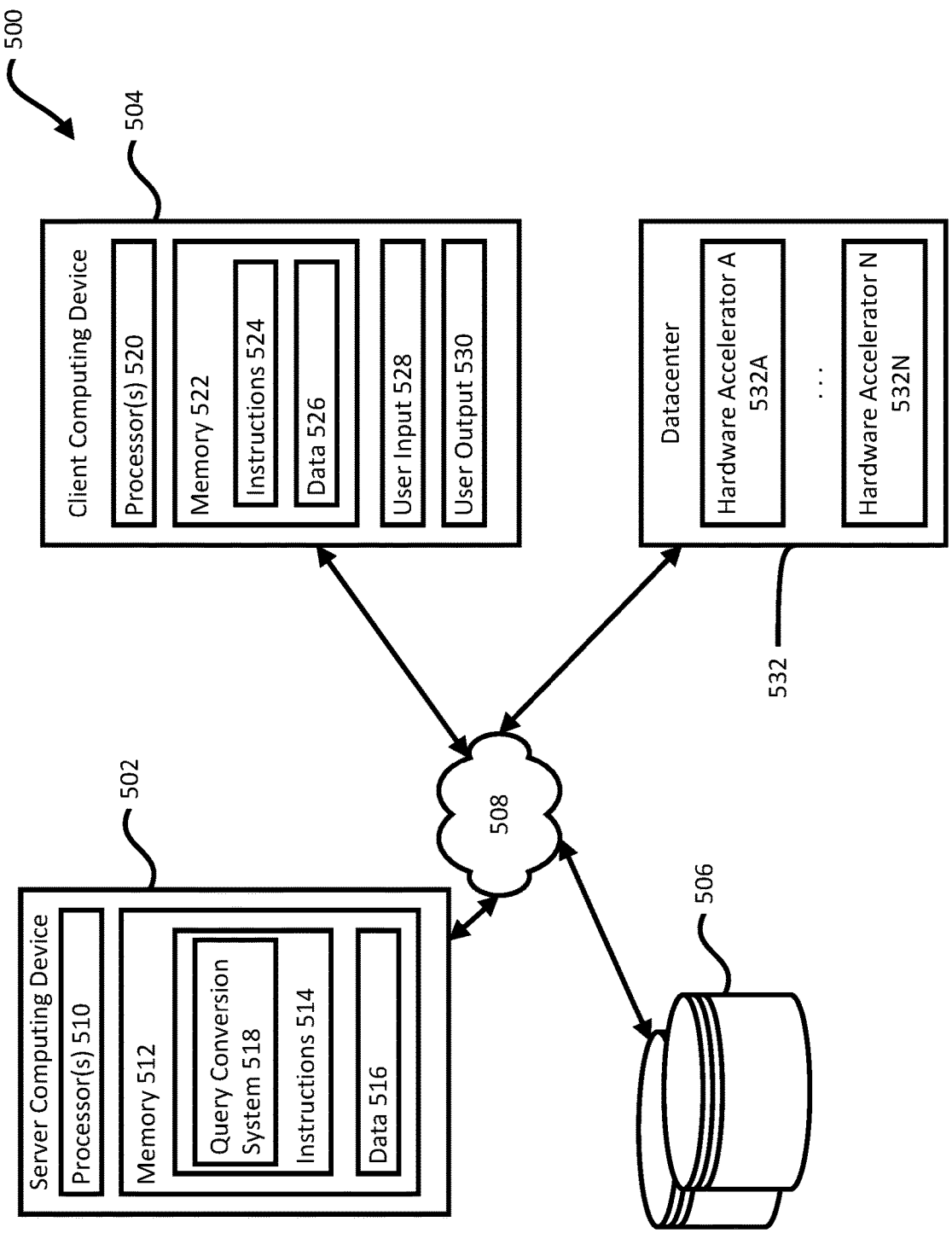
FIG. 5 depicts a block diagram of an example environment for implementing a query conversion system according to aspects of the disclosure.

FIG. 5 depicts a block diagram of an example environment 500 for implementing a query conversion system 518. The query conversion system 518 can be implemented on one or more devices having one or more processors in one or more locations, such as in server computing device 502. Client computing device 504 and the server computing device 502 can be communicatively coupled to one or more storage devices 506 over a network 508. The storage devices 506 can be a combination of volatile and non-volatile memory and can be at the same or different physical locations than the computing devices 502, 504. For example, the storage devices 506 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 502 can include one or more processors 510 and memory 512. The memory 512 can store information accessible by the processors 510, including instructions 514 that can be executed by the processors 510. The memory 512 can also include data 516 that can be retrieved, manipulated, or stored by the processors 510. The memory 512 can be a type of transitory or non-transitory computer readable medium capable of storing information accessible by the processors 510, such as volatile and non-volatile memory. The processors 510 can include one or more central processing units (CPUs), graphic processing units (GPUs), field-programmable gate arrays (FPGAs), and/or application-specific integrated circuits (ASICs), such as tensor processing units (TPUs).

The instructions 514 can include one or more instructions that, when executed by the processors 510, cause the one or more processors 510 to perform actions defined by the instructions 514. The instructions 514 can be stored in object code format for direct processing by the processors 510, or in other formats including interpretable scripts or collections of independent source code modules that are interpreted on demand or compiled in advance. The instructions 514 can include instructions for implementing a query conversion system 518, which can correspond to the query conversion system 100 of FIG. 1. The query conversion system 518 can be executed using the processors 510, and/or using other processors remotely located from the server computing device 502.

The data 516 can be retrieved, stored, or modified by the processors 510 in accordance with the instructions 514. The data 516 can be stored in computer registers, in a relational or non-relational database as a table having a plurality of different fields and records, or as JSON, YAML, proto, or XML documents. The data 516 can also be formatted in a computer-readable format such as, but not limited to, binary values, ASCII, or Unicode. Moreover, the data 516 can include information sufficient to identify relevant information, such as numbers, descriptive text, proprietary codes, pointers, references to data stored in other memories, including other network locations, or information that is used by a function to calculate relevant data.

The client computing device 504 can also be configured similarly to the server computing device 502, with one or more processors 520, memory 522, instructions 524, and data 526. The client computing device 504 can also include a user input 528 and a user output 530. The user input 528 can include any appropriate mechanism or technique for receiving input from a user, such as keyboard, mouse, mechanical actuators, soft actuators, touchscreens, microphones, and sensors.

The server computing device 502 can be configured to transmit data to the client computing device 504, and the client computing device 504 can be configured to display at least a portion of the received data on a display implemented as part of the user output 530. The user output 530 can also be used for displaying an interface between the client computing device 504 and the server computing device 502. The user output 530 can alternatively or additionally include one or more speakers, transducers or other audio outputs, a haptic interface or other tactile feedback that provides non-visual and non-audible information to the platform user of the client computing device 504.

Although FIG. 5 illustrates the processors 510, 520 and the memories 512, 522 as being within the respective computing devices 502, 504, components described herein can include multiple processors and memories that can operate in different physical locations and not within the same computing device. For example, some of the instructions 514, 524 and the data 516, 526 can be stored on a removable SD card and others within a read-only computer chip. Some or all of the instructions 514, 524 and data 516, 526 can be stored in a location physically remote from, yet still accessible by, the processors 510, 520. Similarly, the processors 510, 520 can include a collection of processors that can perform concurrent and/or sequential operation. The computing devices 502, 504 can each include one or more internal clocks providing timing information, which can be used for time measurement for operations and programs run by the computing devices 502, 504.

The server computing device 502 can be connected over the network 508 to a data center 532 housing any number of hardware accelerators 532A-N. The data center 532 can be one of multiple data centers or other facilities in which various types of computing devices, such as hardware accelerators, are located. Computing resources housed in the data center 532 can be specified for deploying models related to processing natural language queries by converting the natural language query to a database language query, as described herein.

The server computing device 502 can be configured to receive requests to process data from the client computing device 504 on computing resources in the data center 532. For example, the environment 500 can be part of a computing platform configured to provide a variety of services to users, through various user interfaces and/or application programming interfaces (APIs) exposing the platform services. The variety of services can include processing queries by converting natural language queries into database language queries. The client computing device 504 can transmit input data associated with converting natural language queries into database language queries. The query conversion system 518 can receive the input data, and in response, generate output data including a result for a query and/or a database language query.

As other examples of potential services provided by a platform implementing the environment, the server computing device 502 can maintain a variety of models in accordance with different constraints available at the data center 532. For example, the server computing device 502 can maintain different families for deploying models on various types of TPUs and/or GPUs housed in the data center 532 or otherwise available for processing.

Figure 6:
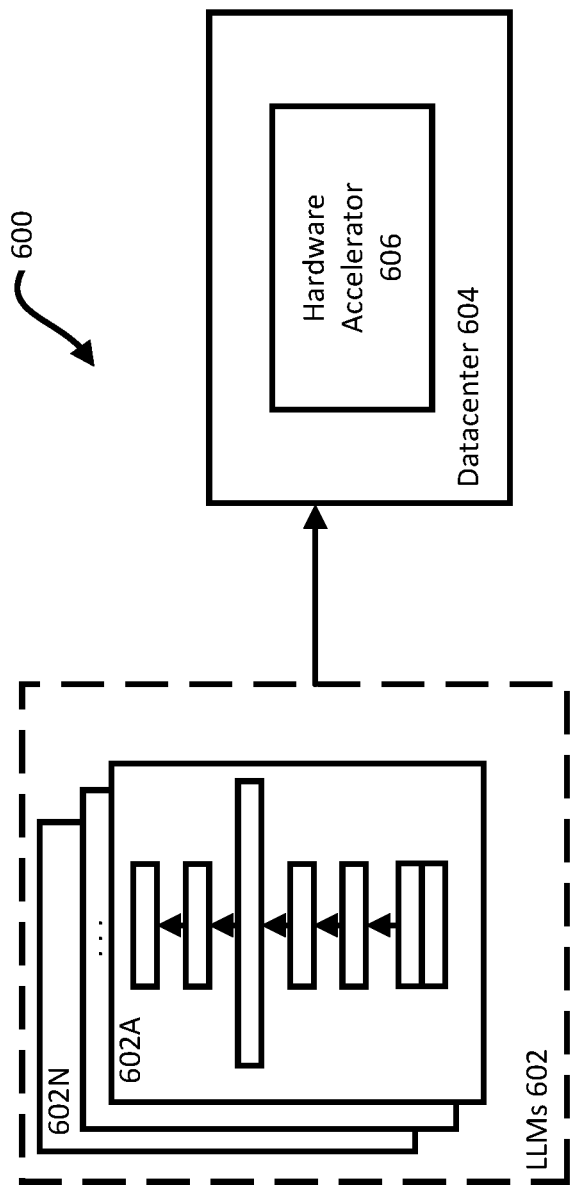
FIG. 6 depicts a block diagram illustrating one or more large language model architectures according to aspects of the disclosure.

FIG. 6 depicts a block diagram 600 illustrating one or more LLM architectures 602, more specifically 602A-N for each architecture, for deployment in a datacenter 604 housing a hardware accelerator 606 on which the deployed LLMs 602 will execute, such as for providing natural language query processing. The hardware accelerator 606 can be any type of processor, such as a CPU, GPU, FPGA, or ASIC such as a TPU.

An architecture 602 of a LLM can refer to characteristics defining the LLM, such as characteristics of layers for the LLM, how the layers process input, or how the layers interact with one another. The architecture 602 of the LLM can also define types of operations performed within each layer. One or more LLM architectures 602 can be generated that can output results, such as for natural language query processing. Example LLM architectures 602 can correspond to pathway language models, such as PaLM-62B, PaLM-540B, or GPT-3.

Referring back to FIG. 5, the devices 502, 504 and the data center 532 can be capable of direct and indirect communication over the network 508. For example, using a network socket, the client computing device 504 can connect to a service operating in the data center 532 through an Internet protocol. The devices 502, 504 can set up listening sockets that may accept an initiating connection for sending and receiving information. The network 508 can include various configurations and protocols including the Internet, World Wide Web, intranets, virtual private networks, wide area networks, local networks, and private networks using communication protocols proprietary to one or more companies. The network 508 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 508, in addition or alternatively, can also support wired connections between the devices 502, 504 and the data center 532, including over various types of Ethernet connection.

Although a single server computing device 502, client computing device 504, and data center 532 are shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing optimization models, and any combination thereof.

Figure 7:
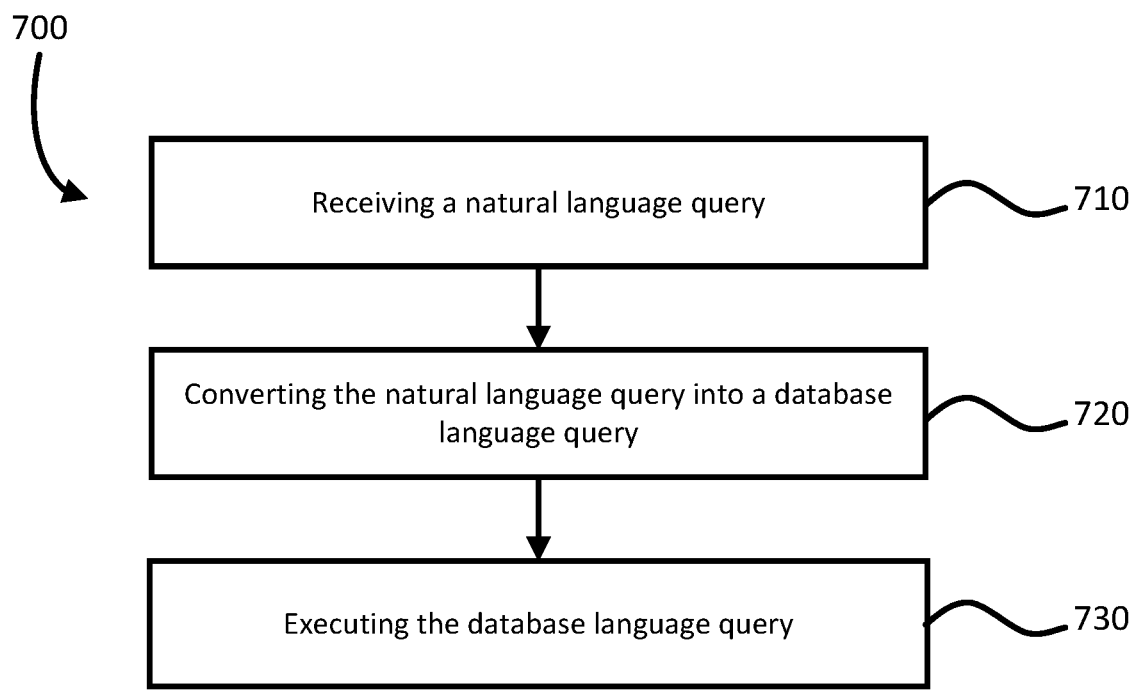
FIG. 7 depicts a flow diagram of an example process for processing queries according to aspects of the disclosure.

FIG. 7 depicts a flow diagram of an example process 700 for processing queries. The example process 700 can be performed on a system of one or more processors in one or more locations, such as the query conversion system 100 as depicted in FIG. 1.

As shown in block 710, the query conversion system 100 can receive a natural language query. The query conversion system 100 can further receive database information, which can include database schema, primary keys, and/or foreign keys. For example, q can be the natural language query and $D_q$ can be the database information. The database $D_q=\{S, K_p, K_f\}$ can include database schema S, primary keys $K_p$, and foreign keys $K_f$. The database schema S can contain multiple tables $T_t:S=\{T_1, T_2, \ldots, T_t, \ldots\}$. Each table $T_t$ can include a table name $N_t$, column names $c_j$, and column data types $t_j:T_k=\{N_k, (c_{k1}, t_{k1}), (c_{k2}, t_{k2}), \ldots, (c_{kj}, t_{kj}), \ldots\}$. The primary keys $K_p$ can uniquely identify rows of each table $T_t$ and the foreign keys $K_f$ can join multiple tables.

As shown in block 720, the query conversion system 100 can convert the natural language query into a database language query using the database information. For example, the query conversion system 100 can convert the natural language query q into SQL with the database information $D_q$. To be described further below with respect to FIG. 8, the query conversion system 100 can generate various database description prompts, sample one or more LLMs multiple times with the various database description prompts to generate a plurality of potential database language queries, execute the plurality of potential database language queries to generate a plurality of potential results, and select the database language query that provides a consistent result.

As shown in block 730, the query conversion system 100 can execute the database language query using the selected database language query. The query conversion system 100 can provide a result for the query.

Figure 8:
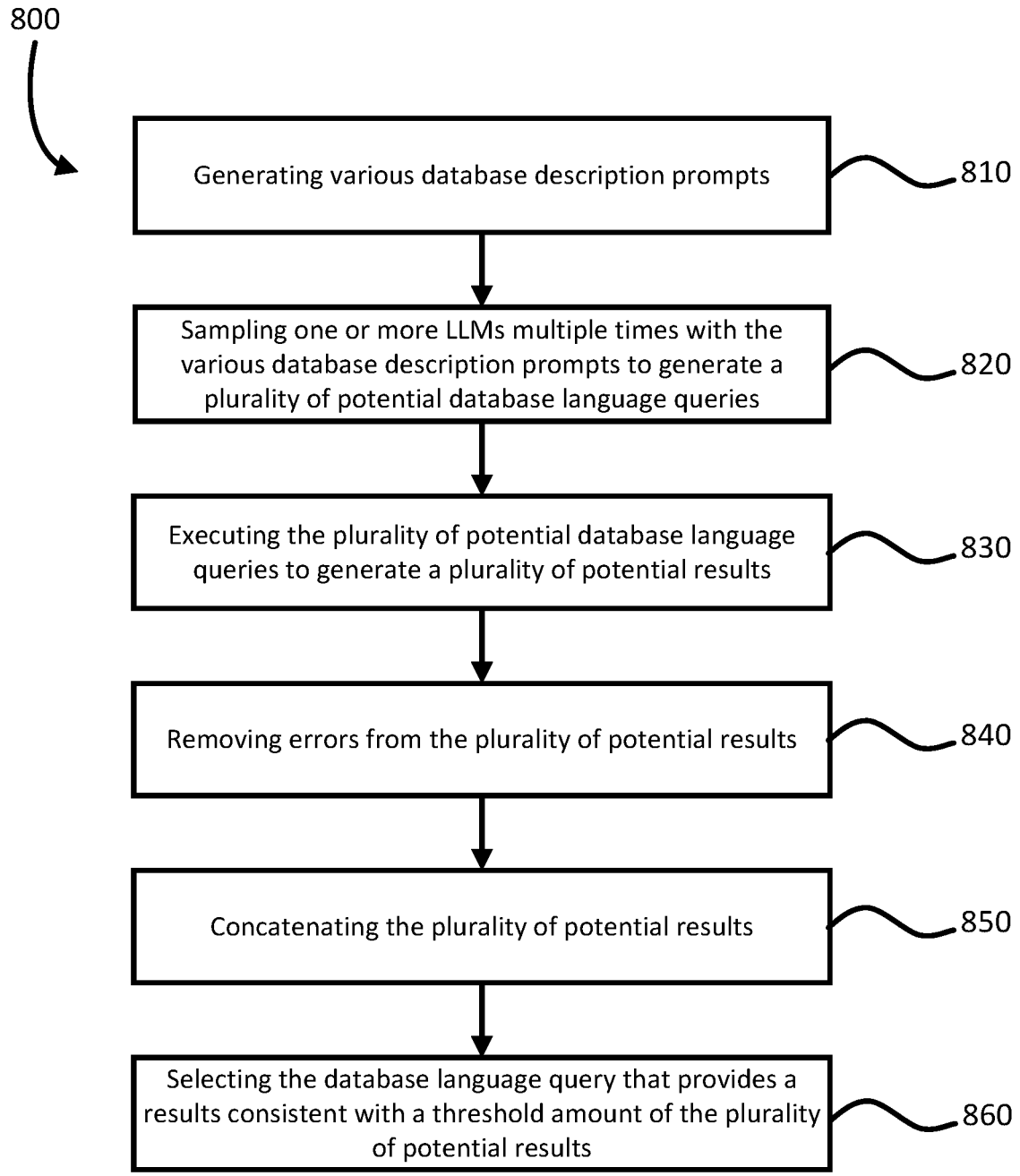
FIG. 8 depicts a flow diagram of an example process for converting a natural language query into a database language query according to aspects of the disclosure.

FIG. 8 depicts a flow diagram of an example process 800 for converting a natural language query into a database language query. The example process 800 can be performed on a system of one or more processors in one or more locations, such as the query conversion system 100 as depicted in FIG. 1.

As shown in block 810, the query conversion system 100 can generate various database description prompts. The database description prompts can include one or more concise prompts and one or more verbose prompts. Concise database description prompts can linearize information in a table, and verbose database description prompts can describe the database information with natural language while emphasizing higher priority information. For example, $F=\{f_1, f_2, \ldots\}$ can be a collection of different design functions, where $f_1$ is verbose and $f_2$ is concise. For each design function $f$, the query conversion system 100 can generate prompts using the database information $D_q$ and the query q.

As shown in block 820, the query conversion system 100 can sample one or more LLMs multiple times with the various database description prompts to generate a plurality of potential database language queries. For example, prediction objectives can be represented as:

$$p(sql \mid LLM, q) = \sum_f p(sql \mid LLM, f, q) p(f) \qquad (1)$$

p(f) can correspond to a mixing coefficient. For instance, when evenly mixing prompts, p(f)=1/nF where nF is the number of design functions. Other mixing coefficients may be utilized as well. p(sql|LLM, f, q) can correspond to a sampling probability of generating sql. Trained LLMs can specify the distribution l:q→sql, where samples can be drawn from:

$$\text{Prompt}_q = f(q, D_q) \quad (2)$$

$$sql_{qf} \sim_{i.i.d} LLM(\text{Prompt}_q, r) \quad (3)$$

The query conversion system 100 can sample B times from the LLM with the same prompt $\text{Prompt}_q$ to get sql collections:

$$M_{qf} = \{sql_{qf}^1, \ldots, sql_{qf}^b\}_B \quad (4)$$

As shown in block 830, the query conversion system 100 can execute the plurality potential database language queries to generate a plurality of potential results. For example, the query conversion system 100 can execute the SQL collections using an SQL database engine to yield outputs O as the execution result of SQL on the provided database:

$$O_{qf} = \{O_{qf}^b: O_{qf}^b = Exec(sql_{qf}^b, D_q), sql_q^b \in M_{qf}\} \quad (5)$$

As shown in block 840, the query conversion system 100 can remove errors from the plurality of potential results. For example, the query conversion system 100 can exclude outputs $O_{qf}$ that yield errors such that only the valid outputs remain. The query conversion system 100 can obtain (SQL, outcome) pairs for prompt design $f: R_{qf} = (M_{qf}, O_{qf}) = \{(M_{qf}^b, O_{qf}^b): O_{qf}^b \neq errors\}$. The query conversion system 100 can repeat blocks 830 and 840 for each prompt design function $\Theta$.

As shown in block 850, the query conversion system 100 can concatenate the plurality of potential results. For example, the query conversion system 100 can generate $R_q = \{R_{q1}, \ldots, R_{qf}, \ldots\}$nF by concatenating the results across multiple prompt designs to obtain:

$$M_q = [M_{q1}, \ldots, M_{qf}, \ldots, M_{nF}] \quad (6)$$

$$Q_q = [O_{q1}, \ldots, O_{qf}, \ldots, O_{nF}] \quad (7)$$

As shown in block 860, the query conversion system 100 can select the database language query that provides a consistent result. For example, the query conversion system 100 can select a database language query that provides a result consistent with a threshold amount of the plurality of potential results. The threshold amount can be a majority amount. For instance, the query conversion system 100 can select the SQL that gives an execution outcome consistent with a majority of execution outcomes $O_q$ generated by all $M_q$:

$$sql_{select} = \{sql_q^k: O_q^k = \text{Majority}(O_q)\} \quad (8)$$

$$O_q^k \in Q_q, sql_q^k \in M_q \quad (9)$$

As another example, query conversion system 100 can select a database query language using a machine learning model, such as an LLM. For example, the query conversion system 100 can input the potential database query languages and corresponding results into a prompt for an LLM and the LLM can select the database query language.

The query conversion system 100 can utilize a single LLM or multiple LLMs. Multiple LLMs can increase diversity for more refined outputs. A mixture of LLMs can be utilized by:

$$p(sql|q) = \sum_{LLM} \sum_f p(sql|LLM, f, q) p(f) p(LLM) \quad (10)$$

Aspects of this disclosure can outperform in-context learning without labeled data by a large margin and can close the gap with finetuning learning with thousands of labeled data, allowing for automatically generating queries with significantly less processing power and memory consumption. For example, aspects of this disclosure outperformed in-context learning without labeled data by about 7% in execution accuracy and by about 8.1% in test suite accuracy. As another example, aspects of this disclosure performed less than fine-tuned learning by about 6% in execution accuracy and by about 4% in test suite accuracy but utilized significantly less processing power and memory consumption.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks, such as a TensorFlow framework, a Microsoft Cognitive Toolkit framework, an Apache Singa framework, or an Apache MXNet framework, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for processing queries, the method comprising:
 receiving, by one or more processors, a natural language query and database information;
 converting, by the one or more processors, the natural language query into a database language query using the database information, wherein converting the natural language query into the database language query comprises:
  generating various database description prompts from the natural language query and the database information;
  sampling a large language model (LLM) multiple times with the various database description prompts using a mixing coefficient for weighting the various description prompts to generate a plurality of potential database language queries;

executing the plurality of potential database language queries to generate a plurality of potential results; and selecting the database language query that provides a result consistent with a threshold amount of the plurality of potential results; and executing, by the one or more processors, the database language query to generate a result for the natural language query.

2. The method of claim 1, wherein the database information comprises database schema, database content, primary keys that uniquely identify rows of each table of the database schema, and foreign keys that join one or more tables of the data schema.

3. The method of claim 1, wherein the various database description prompts comprise a concise prompt and a verbose prompt.

4. The method of claim 1, wherein converting the natural language query into a database language query comprises removing errors from the plurality of potential results.

5. The method of claim 1, wherein converting the natural language query into a database language query comprises concatenating the plurality of potential results.

6. The method of claim 1, wherein the threshold amount comprises a majority of the plurality of potential results.

7. The method of claim 1, wherein the database language query comprises at least one of standard query language (SQL) or graph query language (GraphQL).

8. A system comprising:
one or more processors; and
one or more storage devices coupled to the one or more processors and storing instructions that, when executed by the one or more processors, cause the one or more processors to perform operations for processing queries, the operations comprising:
receiving a natural language query and database information;
converting the natural language query into a database language query using the database information, wherein converting the natural language query into the database language query comprises:
generating various database description prompts from the natural language query and the database information;
sampling a large language model (LLM) multiple times with the various database description prompts using a mixing coefficient for weighting the various description prompts to generate a plurality of potential database language queries;
executing the plurality of potential database language queries to generate a plurality of potential results; and
selecting the database language query that provides a result consistent with a threshold amount of the plurality of potential results; and executing the database language query to generate a result for the natural language query.

9. The system of claim 8, wherein the database information comprises database schema, database content, primary keys that uniquely identify rows of each table of the database schema, and foreign keys that join one or more tables of the data schema.

10. The system of claim 8, wherein the various database description prompts comprise a concise prompt and a verbose prompt.

11. The system of claim 8, wherein converting the natural language query into a database language query comprises removing errors from the plurality of potential results.

12. The system of claim 8, wherein converting the natural language query into a database language query comprises concatenating the plurality of potential results.

13. The system of claim 8, wherein the threshold amount comprises a majority of the plurality of potential results.

14. The system of claim 8, wherein the database language query comprises at least one of standard query language (SQL) or graph query language (GraphQL).

15. A non-transitory computer readable medium for storing instructions that, when executed by one or more processors, cause the one or more processors to perform operations for processing queries, the operations comprising:
receiving a natural language query and database information;
converting the natural language query into a database language query using the database information, wherein converting the natural language query into the database language query comprises:
generating various database description prompts from the natural language query and the database information;
sampling a large language model (LLM) multiple times with the various database description prompts using a mixing coefficient for weighting the various description prompts to generate a plurality of potential database language queries;
executing the plurality of potential database language queries to generate a plurality of potential results; and
selecting the database language query that provides a result consistent with a threshold amount of the plurality of potential results; and
executing the database language query to generate a result for the natural language query.

16. The non-transitory computer readable medium of claim 15, wherein converting the natural language query into a database language query comprises removing errors from the plurality of potential results.

17. The non-transitory computer readable medium of claim 15, wherein converting the natural language query into a database language query comprises concatenating the plurality of potential results.

* * * * *